Figure 1:
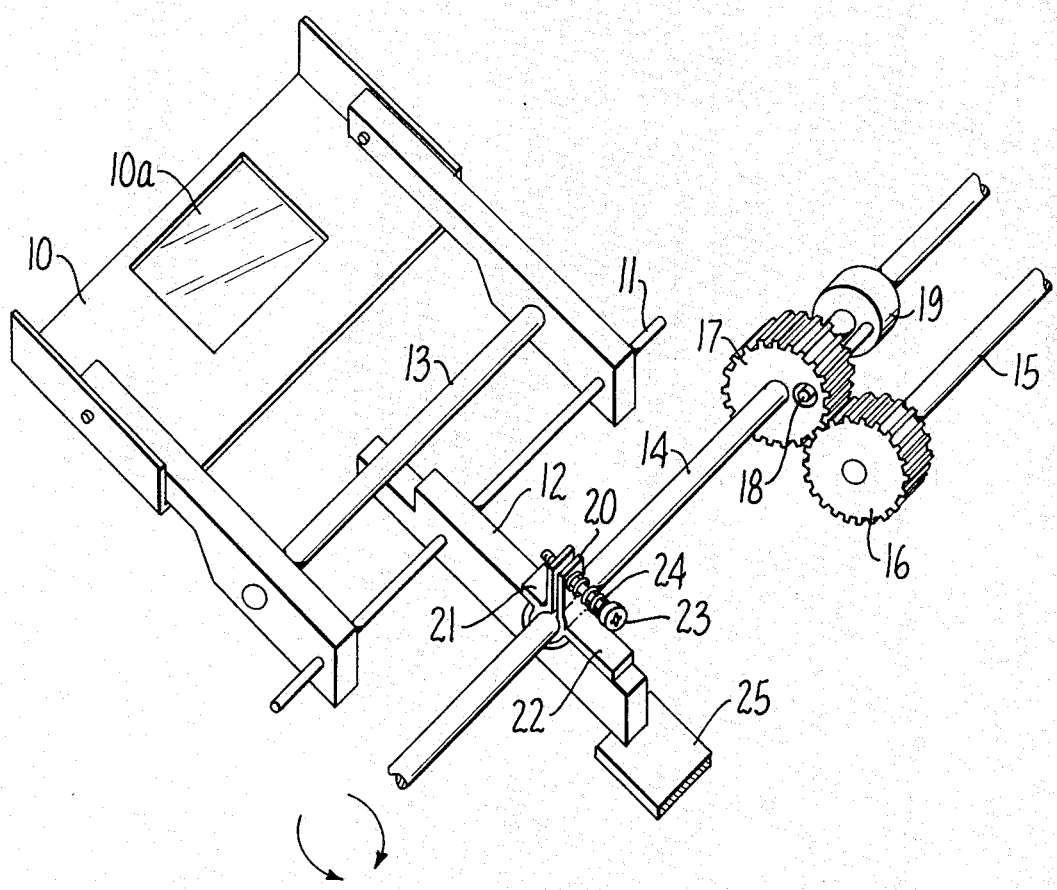

United States Patent [19]

Priest

[11] 3,868,180

[45] Feb. 25, 1975

[54] TAPE CLAMP MECHANISM FOR MICROFILM READER

[75] Inventor: Lyle Gilbert Priest, Palo Alto, Calif.

[73] Assignee: Information Design, Inc., Menlo Park, Calif.

[22] Filed: Aug. 9, 1972

[21] Appl. No.: 279,243

Related U.S. Application Data

[63] Continuation-in-part of Ser. No. 268,094, June 30, 1972, abandoned.

[52] U.S. Cl. .................................................. 353/95
[51] Int. Cl. ........................................... G03b 1/48
[58] Field of Search ............. 353/95, 96, 23, 24, 26; 352/221, 229, 225

[56] References Cited
UNITED STATES PATENTS

| | | | |
|---|---|---|---|
| 1,692,092 | 11/1928 | Ochmichen | 352/225 |
| 2,692,529 | 10/1954 | Halaham | 353/96 |
| 2,851,923 | 9/1958 | Marvin | 353/95 |
| 3,716,292 | 2/1973 | Long | 353/95 |

FOREIGN PATENTS OR APPLICATIONS

| | | | |
|---|---|---|---|
| 860,247 | 1/1941 | France | 352/225 |

*Primary Examiner*—William D. Martin, Jr.
*Assistant Examiner*—A. J. Mirabito

[57] ABSTRACT

A clamp mechanism for microfilm readers having a film gate and a film drive, said clamping mechanism including means frictionally engaged with a spindle drivingly connected to the film drive with lost motion and further including means frictionally engaged with the spindle for applying forces to actuate the film gate upon rotation of the spindle in either direction of rotation.

5 Claims, 2 Drawing Figures

TAPE CLAMP MECHANISM FOR MICROFILM READER

This application is a continuation-in-part of U.S. application Ser. No. 268,094 filed June 30, 1972 and now abandoned.

This invention relates generally to microfilm readers and other devices which project images contained on microfilm. A common problem of such devices is that of maintaining the film in the plane of focus while it is being examined or viewed. The customary solution to that problem is to pass the film between a pair of glass platens (or film gate) which clamps the film while stationary, the platens being separated or lifted when the film is to be moved. The glass platens have been separated or lifted in essentially three different ways. The most common method of separating the platens is by simple manual control. However, this usually results in severly abraded film since the platen is often inadvertently left closed rather than opened. A second method for operating the platens involves the use of a solenoid which is energized with the motor for driving the film. Such means, however, provide no protection if the film must be moved manually also, and this is usually required to properly locate and center the image. A third means for separating the glass platens derives an opening force from the mechanism that moves the film. Those devices of the prior art typically produce relatively high film tensions under certain conditions of operation and may damage the film. In any event, the present invention is most nearly related to this latter type of device.

In brief, this invention utilizes forces derived from a friction clutch which opens a film gate by separating the glass platens between which the film passes. These opening forces are applied whenever the drive shaft of the microfilm reader is operated, whether by hand or by motor. The friction clutch engages a spindle, that also drivingly connects to the film drive, a rotation of spindle causing the friction clutch to operate a pivoted rocker arm and actuate the film gate.

A particular feature of the present invention is that the forces required for opening the film gate are relatively low, and it is only necessary to provide sufficient force to overcome the weight of the platen or such other closing force that may be supplied by springs or counterweights.

A principal object of the present invention is, therefore, to provide a clamping mechanism for microfilm readers which derives an opening force from the film drive but is characterized by the relatively low driving torque required to open the film gate.

Another object of the present invention is to provide a relatively inexpensive clamping device for microfilm readers of the kind described.

A still further object is to provide a clamping mechanism for microfilm readers which applies an opening force to a film gate independently of the direction of film movement.

Another object of the invention is to provide an improved clamping mechanism for microfilm readers that opens the film gate when the film is moved in either direction and requires opening forces that are substantially uniform and independent of the direction of film movement.

Other objects of this invention will become apparent in view of the following detailed description.

Figure 2:
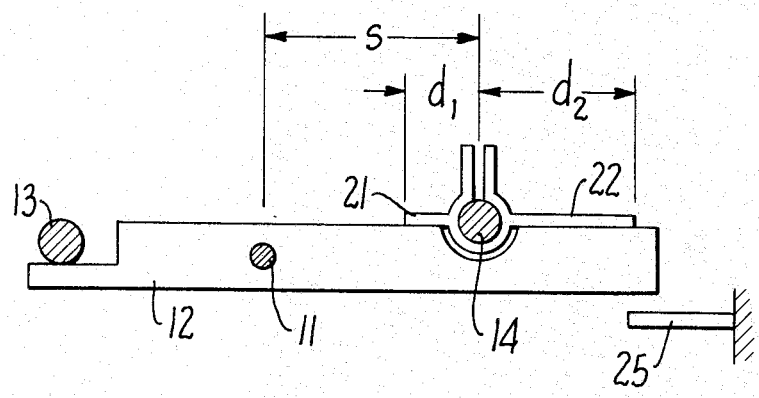

In the drawings forming a part of this application and in which like parts are identified by like reference numerals, FIG. 1 is a perspective of a preferred embodiment of this invention; and FIG. 2 is a detail and diagramatic view of a portion of the mechanism shown in FIG. 1.

Referring to FIG. 1 in particular, a platen 10 having a glass window 10a is pivoted upon the fixed shaft 11 of what may be considered a standard microfilm reader. Platen 10 is the operative clamping member of a pair of platens between which a film strip is clamped for viewing. In the embodiment shown, gravity alone is employed to pivot platen 10 about the shaft 11 to place it in contact with or in clamping relationship to the other platen (not shown). It is the mechanism which is employed for lifting platen 10 (and allowing the platen to gravitate into a clamping position) to which this invention is directed.

More particularly, the preferred embodiment shown comprises a pivoted rocker arm 12 which, like platen 10, pivots on the axis of shaft 11. One portion of rocker arm 12 comes under a lift rod 13, said rod forming part of platen 10. It will be readily apparent that a clockwise movement of rocker arm 12 contacts lift rod 13, lifting platen 10, thereby opening the film gate. Rocker arm 12 is, in turn, acted upon by a friction clutch or means that frictionally engage a power input spindle 14. This spindle is also drivingly connected to a film drive including a shaft 15 by means that provide a small amount of lost motion. More specifically, gear 16 on drive shaft 15 meshes with a gear 17 that is loosely mounted on spindle 14. Rotation of spindle 14 is similarly imparted to gear 17 through a pin 18 secured to spindle 14 upon a collar 19. Pin 18 projects into an enlarged opening in gear 17 and the sloppy fit between pin 18 and the opening provides a small amount of angular lost motion.

Actuating forces are applied to rocker arm 12 by means of an adjustable friction clutch 20 comprising a split collar and having a pair of lever arms 21 and 22 that project radially from opposite sides of the collar. The force with which clutch 20 engages spindle 14 may be set or adjusted by means of an adjusting screw 23 that bears against the end of a helical spring 24. Screw 23 extends through one flange of the collar and threadedly engages a second flange. A stop 25 is located in the path of rocker arm movement to restrict or limit its angular movement to a degree less than the angular lost motion between spindle 14 and gear 17.

Referring to FIG. 2, the lengths of lever arms 21 and 22 are selected to produce substantially equal moments of force upon pivoted rocker arm 12. This is important and desirable in the construction of a device where the platen opening force is independent of shaft rotation. If otherwise, the clutch would have to be adjusted for each change in shaft rotation to overcome the clamping forces required and avoid unnecessary loading of the power source.

The preferred embodiment is made to a formula based on the distance (s) between the pivot axis of shaft 11 and the axis of spindle 14. The formula is also based on the effective moments produced by lever arms 21 and 22. Inasmuch as equal moments of force are to be applied to the rocker arm independently of the direction of spindle rotation, the length of lever arms 21 and 22 (measured from axis of spindle 14) as indicated by the letters $d_1$ and $d_2$, respectively, will bear a relationship one to the other in accordance with the formula $d_1 = (d_2 \cdot s)/(s + 2d_2)$.

In operation, the weight of platen 10 normally maintains the platen in clamping relationship to the film strip or glass surface. However, whenever a driving torque is applied to spindle 14, whether by motive means or manually, rotation of the spindle causes clutch 20 to rotate a few degrees and make contact with rocker arm 12 through lever arms 21 or 22, depending on the direction of spindle rotation. Continued rotation of spindle 14 lifts platen 10 a small amount, such as ⅛ inch, the angular movement of rocker arm 12 being less than the lost motion between spindle 14 and gear 17 as controlled by stop 25.

When a driving torque is no longer applied to spindle 14, the weight of platen 10 alone causes it to gravitate until glass 10a rests upon the bottom glass or film strip. The lost motion provided by pin 18 and the opening in gear 17 permits spindle 14 to be rotated in the opposite direction by the weight of the platen without also driving shaft 15 and the film drive mechanism.

Although a preferred embodiment of this invention has been illustrated and described, various modifications and changes may be resorted to without departing from the spirit of the invention or the scope of the attached claims and each of such modifications and changes is contemplated.

What is claimed is:

1. A clamp mechanism for microfilm readers and the like having a film gate, a film drive, and means responsive to operation of the film drive for actuating the film gate to clamp or release a film strip, comprising: a pivoted rocker arm engagable with the film gate, a spindle, means drivingly connecting said spindle to said film drive with lost motion, and contact means frictionally engaged with said spindle for pivoting said pivoted rocker arm upon rotation of said spindle in either clockwise or counterclockwise directions, said contact means being positioned to contact said pivoted rocker arm and apply a pivotal force at two points of leverage on said rocker arm, one point of leverage being made by a clockwise rotation and the other point of leverage being made by a counterclockwise rotation, whereby rotation of said spindle pivots said pivoted rocker arm to actuate said film gate.

2. The mechanism of claim 1, the two points of leverage being located to produce substantially equal moments of force upon said pivoted rocker arm.

3. The mechanism of claim 1, said pivoted rocker arm being supported upon a pivot axis that is parallel with and spaced from the axis of said spindle a distance $s$, one point of leverage being applied to said rocker arm at a distance $d_1$ from said spindle axis and $s - d_1$ from said pivot axis, the other point of leverage being applied at a distance $d_2$ from said spindle axis and $s + d_2$ from said pivot axis, and further wherein the distances $s$, $d_1$ and $d_2$ bear a relationship one to the other in accordance with the formula $d_1 = (d_2 \cdot s)/(s + 2d_2)$ 4. The mechanism of claim 1, said means drivingly connecting said spindle to the film drive with lost motion comprising a pair of gears, one gear loosely mounted on said spindle and rotatably engaged with the other gear, said other gear being drivingly connected to the film drive, and means for engaging said one gear with said spindle to impart rotation of movement of said film drive after said spindle has been slightly rotated in either direction.

5. The mechanism of claim 1, and further comprising means for restricting the angular movement of the means frictionally engaged with said spindle, said restricted angular movement being less than the angular lost motion between said spindle and film drive.

* * * * *